United States Patent
Taylor

(10) Patent No.: US 9,823,069 B2
(45) Date of Patent: Nov. 21, 2017

(54) MEASURING APPARATUS TO AIDE WITH HANGING OBJECTS

(71) Applicant: Betty Taylor, Canton, GA (US)

(72) Inventor: Betty Taylor, Canton, GA (US)

(73) Assignee: Betty Taylor, Canton, GA (US)

( * ) Notice: Subject to any disclaimer, the term of this patent is extended or adjusted under 35 U.S.C. 154(b) by 0 days.

(21) Appl. No.: 14/842,631

(22) Filed: Sep. 1, 2015

(65) Prior Publication Data
US 2017/0059316 A1   Mar. 2, 2017

(51) Int. Cl.
*G01B 3/10* (2006.01)
*G01C 9/24* (2006.01)

(52) U.S. Cl.
CPC ............. *G01C 9/24* (2013.01); *G01B 3/1041* (2013.01); *G01B 2003/1051* (2013.01)

(58) Field of Classification Search
CPC .................................... G01C 9/02; G01B 3/08
USPC ......................................... 33/613, 1 LE, 764
See application file for complete search history.

(56) References Cited

U.S. PATENT DOCUMENTS

| | | | | |
|---|---|---|---|---|
| 2,788,584 A * | 4/1957 | Adrien | ................ | B41F 27/005 33/615 |
| 3,427,721 A * | 2/1969 | Moll | ................ | G01B 3/10 33/1 R |
| 3,668,781 A * | 6/1972 | Teter | ................ | A63C 19/08 33/1 H |
| 4,381,607 A * | 5/1983 | Place | ................ | B25H 7/02 33/1 LE |
| 6,167,632 B1 * | 1/2001 | Shor | ................ | B44D 3/38 33/413 |
| 8,739,423 B1 * | 6/2014 | Cortum | ................ | A47G 1/205 33/613 |
| 9,032,637 B2 * | 5/2015 | Propp | ................ | B25H 7/04 33/613 |
| 2002/0078583 A1 * | 6/2002 | Richardson | ............ | A47G 1/205 33/613 |
| 2006/0101661 A1 * | 5/2006 | Schmidt | ................ | A47G 1/205 33/613 |

* cited by examiner

*Primary Examiner* — Yaritza Guadalupe-McCall

(57) ABSTRACT

Implementations of a measuring apparatus to aide with hanging objects are provided. In some implementations, the measuring apparatus comprises a housing containing a level and a first coiled tape blade, a second coiled tape blade, and a third coiled tape blade. In some implementations, each tape blade includes measuring indicia and each coiled tape blade is configured to uncoil and extend outside the housing and retract to a coiled configuration. In some implementations, the first tape blade is configured to extend in a first direction, and the second tape blade is configured to extend in a second direction. In some implementations, the second direction is 180 degrees from the first direction. In some implementations, the third tape blade is configured to extend in a third direction. In some implementations the third direction is 90 degrees from the first direction. In some implementation, the third tape blade has attached to the end that extends outside the housing a weight.

4 Claims, 2 Drawing Sheets

MEASURING APPARATUS TO AIDE WITH HANGING OBJECTS

TECHNICAL FIELD

This disclosure relates to implementations of a measuring apparatus to aide with hanging objects.

BACKGROUND

When hanging objects on the wall, a tape measure may have to be used multiple times as multiple measurements may be needed to mark the intended location of the object to be hung. A separate level then may be used to ensure that the markings are level. For example, the typical procedure for hanging curtains on a wall involve taking width and height measurements using a tape measure and then using a level to ensure that the markings are level. A tape measure and level also may be used to hang other objects, such as pictures, on a wall.

Existing measurement tools that combine a tape measure and level are not designed for the measurements needed to hang objects, particularly curtains, on a wall. For example, U.S. Pat. No. 4,506,451 discloses a multi-functional square and angle marking tool. However, among other things, the marking tool disclosed in the '451 patent includes only one tape measure and, thus, the marking tool is not designed to make width and height measurements simultaneously.

DETAILED DESCRIPTION

Implementations of a measuring apparatus to aide with hanging objects are provided. In some implementations, the measuring apparatus comprises a housing containing a level and a first coiled tape blade, a second coiled tape blade, and a third coiled tape blade. In some implementations, each tape blade includes measuring indicia and each coiled tape blade is configured to uncoil and extend outside the housing and retract to a coiled configuration. In some implementations, the first tape blade is configured to extend in a first direction, and the second tape blade is configured to extend in a second direction. In some implementations, the second direction is 180 degrees from the first direction. In some implementations, the third tape blade is configured to extend in a third direction. In some implementations the third direction is 90 degrees from the first direction. In some implementation, the third tape blade has attached to the end that extends outside the housing a weight.

Figure 1A:
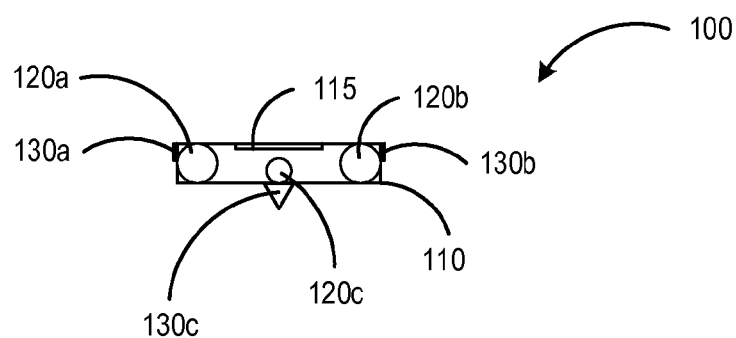
FIGS. 1A and 1B illustrate an example implementation of a measuring apparatus to aide with hanging objects according to the principles of the present disclosure.
Figure 1B:
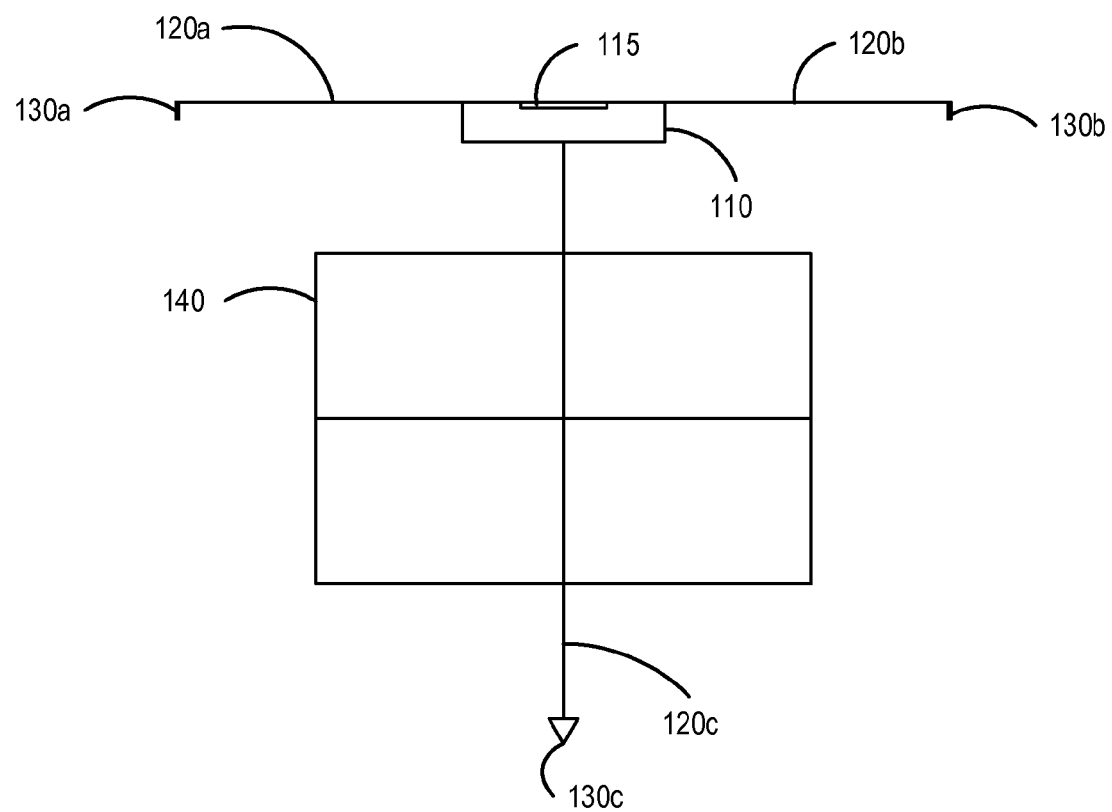

FIGS. 1A and 1B illustrate an example implementation of a measuring apparatus 100 to aide with hanging objects according to the principles of the present disclosure. In some implementations, the measuring apparatus 100 includes a housing 110 for containing a level 115 and a plurality of coiled tape blades (e.g., 120a, 120b, 120c). In some implementations, each blade includes measuring indicia such as linear-measurement markings along the length of the blade for measuring. In some implementations, each coiled tape blade is configured to uncoil and extend outside the housing 110 and retract to a coiled configuration as a traditional tape measure.

In some implementations, for each tape blade (e.g., 120a, 120b, 120c), one end of the tape blade that extends outside the housing has attached thereto a blocker to prevent the end of the tape blade from retracting all the way inside the housing 110 and becoming inaccessible. In some implementations, the blocker may be a hook (e.g., 130a, 130b) or a weight (e.g., 130c). In some implementations, the blocker may be any article. In some implementations, a weight (e.g., 130c) may be used to extend and hold a blade attached thereto (e.g., blade 120c) outside the housing 110.

In some implementations, a first tape blade (e.g., 120a) may be configured to extend in a first direction. In some implementations, a second tape blade (e.g., 120b) may be configured to extend in a second direction. In some implementations, the second direction may be opposite the first direction. In some implementation, the second direction may be 180 degrees from the first direction. In some implementations, a third tape blade (e.g., 130c) may be configured to extend in a third direction. In some implementations, the third direction may be 90 degrees from the first direction.

In some implementations, the measuring apparatus 100 may be configured such that when the measuring apparatus 100 is horizontal as indicated by the level 115, a first tape blade (e.g., 120a) and a second tape blade (120b) may extend in a horizontal direction and the third tape blade (e.g., 120c) may extend in a vertical direction.

In some implementations, the measuring apparatus 100 may include one or more locks configured to lock respective blades in an extended position.

Referring to FIG. 1B, to hang an object, e.g., curtains for a window 140, using the measuring apparatus 100, the height to hang the curtains can be measured using the third tape blade 120c. In some implementations, the weight 130c may be used to help extend and hold the third tape blade 120c outside the housing 110. The horizontal distances may be measured using the first tape blade 120a and the second tape blade 120b. The level 115 can be used to ensure that the measurements, and therefore the curtains, are level.

Figure 2A:
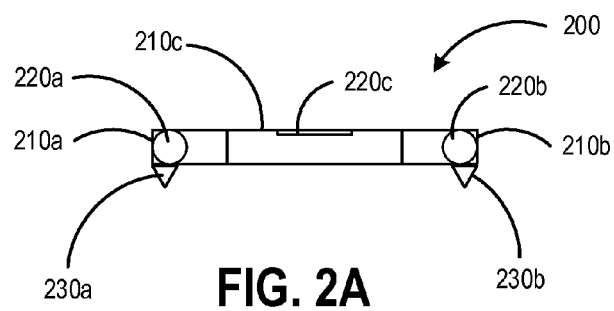
FIGS. 2A and 2B illustrate another example implementation of a measuring apparatus to aide with hanging objects according to the principles of the present disclosure.
Figure 2B:
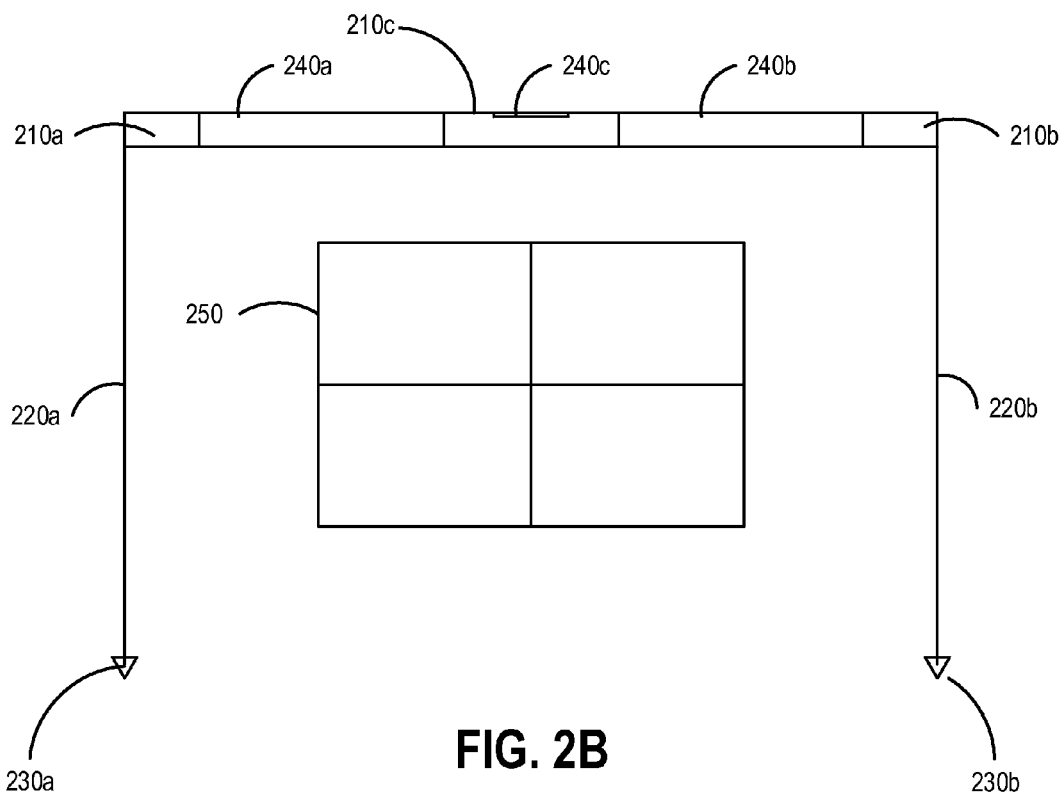

FIGS. 2A and 2B illustrate another example implementation of a measuring apparatus 200 to aide with hanging objects according to the principles of the present disclosure.

In some implementations, the measuring apparatus 200 includes a first housing 210a for containing a first coiled tape blade 220a, a second housing 210b for containing a second coiled tape blade 220b, and a third housing 210c for containing a level 220c. In some implementations, each blade 220a, 220b includes measuring indicia such as linear-measurement markings along the length of the blade for measuring. In some implementations, each coiled tape blade is configured to uncoil and extend outside the housing and retract to a coiled configuration as a tradition tape measure.

In some implementations, for each tape blade (e.g. 220a, 220b), one end of the tape blade that extends outside the housing (e.g., 210a, 210b, respectively) has attached thereto a weight (e.g., 230a, 230b, respectively) to extend and hold the tape blade attached thereto outside the housing.

In some implementations, a first telescopic ruler 240a extends between the first housing 210a and the third housing 210c, and a second telescopic ruler 240b extends between the second housing 210b and the third housing 210c. In some implementations, each telescopic ruler includes measuring indicia such as linear-measurement markings along the length of the ruler for measuring.

In some implementations, the first telescopic ruler 240a may be configured to extend in a first direction. In some implementations, the second telescopic ruler 240b may be configured to extend in a second direction. In some implementations, the second direction may be opposite the first direction. In some implementation, the second direction may be 180 degrees from the first direction. In some implementations, the first tape blade 220a and the second tape blade 220b may be configured to extend in a third direction. In some implementations, the third direction may be 90 degrees from the first direction.

In some implementations, the measuring apparatus 200 may be configured such that when the measuring apparatus 200 is horizontal as indicated by the level 220c, the first telescopic ruler 240a and the second telescopic ruler 240b extend in a horizontal direction and the first tape blade 220a and the second tape blade 220b extend in a vertical direction.

In some implementations, the measuring apparatus 200 may include one or more locks configured to lock respective blades in an extended position.

Referring to FIG. 2B, to hang an object, e.g., curtains for a window 250, using the measuring apparatus 200, the height to hang the curtains can be measured using the first tape blade 220a and/or second tape blade 220b. In some implementations, the weights 230a, 230b may be used to help extend and hold the blades 220a, 220b outside the housing 210a, 210b, respectively. The horizontal distances can be measured using the first telescopic ruler 240a and the second telescopic ruler 240b. The level 210c can be used to ensure that the measurements, and therefore the curtains, are level.

In some implementations, the levels 115, 210c may be bubble levels. In some implementations, the levels may be any instrument designed to indicate whether an object is horizontal.

In some implementations, the tape blades may be metal. In some implementations, the tape blades may be made from steel. In some implementations, the tape blades may be any suitable material.

Reference throughout this specification to "embodiment" or "an implementation" or words of similar import means that a particular described feature, structure, or characteristic is included in at least one embodiment of the present invention. Thus, the phrase "in an embodiment" or "an implementation" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

The invention claimed is:

1. An measuring apparatus comprising: a housing containing a level and a first coiled tape blade, a second coiled tape blade, and a third coiled tape blade wherein each tape blade includes measuring indicia and each coiled tape blade is configured to uncoil and extend outside the housing and retract to a coiled configuration; and wherein the first tape blade is configured to extend in a first direction; wherein the second tape blade is configured to extend in a second direction wherein the second direction is 180 degrees from the first direction; wherein the third tape blade is configured to extend in a third direction wherein the third direction is 90 degrees from the first direction; and wherein the third tape blade has attached to the end that extends outside the housing a weight.

2. A method of using the measuring apparatus of claim 1 to hang an object, the method comprising: using the third tape blade to measure height; using the first tape blade and the second table blade to measure horizontal distances; and using the level to level the horizontal measurement.

3. An measuring apparatus comprising: a housing containing a level and a first coiled tape blade, a second coiled tape blade, and a third coiled tape blade wherein each blade includes measuring indicia and each coiled tape blade is configured to uncoil and extend outside the housing and retract to a coiled configuration and wherein the measuring apparatus is configured such that when the measuring apparatus is horizontal as indicated by the level, the first tape blade and the second tape blade extend in a horizontal direction and the third tape blade extend in a vertical direction and has a weight attached to the end that extends outside the housing.

4. An measuring apparatus comprising: a first housing containing a first coiled tape blade; a second housing containing a second coiled tape blade; a third housing containing a level; a first telescopic ruler configured to extend between the first housing and the third housing wherein the first telescopic ruler is configured to extend in a first direction; and a second telescopic ruler configured to extend between the second housing and the third housing wherein the second telescopic ruler is configured to extend in a second direction wherein the second direction is 180 degrees from the first direction wherein each tape blade includes measuring indicia and each coiled tape blade is configured to uncoil and extend outside the housing and retract to a coiled configuration; wherein each telescopic ruler includes measuring indicia wherein the first tape blade and the second tape blade are configured to extend in a third direction wherein the third direction is 90 degrees from the first direction; wherein the first tape blade has attached to the end that extends outside the first housing a first weight; and wherein the second tape blade has attached to the end that extends outside the second housing a second weight.

* * * * *